(12) United States Patent
Novacoski et al.

(10) Patent No.: US 6,254,283 B1
(45) Date of Patent: Jul. 3, 2001

(54) TERMINUS BODY RETENTION

(75) Inventors: James Edward Novacoski, Yucaipa; Can Trong Nguyen, Garden Grove, both of CA (US)

(73) Assignee: Itt Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/507,930

(22) Filed: Feb. 22, 2000

(51) Int. Cl.[7] .................................................. G02B 6/36
(52) U.S. Cl. ............................... 385/78; 385/76; 385/86; 385/136
(58) Field of Search ......................... 385/76, 77, 78, 385/86, 60, 136, 137, 139

(56) References Cited

U.S. PATENT DOCUMENTS

| | | | |
|---|---|---|---|
| 4,178,068 | 12/1979 | Hoover | 350/96.21 |
| 4,687,288 | 8/1987 | Margolin et al. | 350/96.2 |
| 4,747,658 | 5/1988 | Borsuk et al. | 350/96.2 |
| 4,805,978 | 2/1989 | Bruch et al. | 350/96.2 |
| 5,216,734 | 6/1993 | Grinderslev | 385/60 |
| 5,311,609 | 5/1994 | Abe | 385/60 |
| 5,373,573 * | 12/1994 | Welsh | 385/86 |
| 5,428,703 | 6/1995 | Lee | 385/78 |
| 5,515,466 | 5/1996 | Lee | 385/78 |
| 5,524,159 | 6/1996 | Turgeon et al. | 385/78 |
| 5,577,144 | 11/1996 | Rossana et al. | 385/78 |
| 5,633,970 | 5/1997 | Olson et al. | 385/78 |
| 5,682,451 | 10/1997 | Lee et al. | 385/78 |
| 5,717,802 | 2/1998 | Briggs et al. | 385/75 |
| 5,809,192 * | 9/1998 | Manning et al. | 385/78 |
| 5,828,806 | 10/1998 | Grois et al. | 385/78 |
| 5,915,057 * | 6/1999 | Weigel | 385/76 |

* cited by examiner

*Primary Examiner*—Hemang Sanghavi
(74) *Attorney, Agent, or Firm*—Roger C. Turner

(57) ABSTRACT

An optical fiber terminus and a connector containing such terminus are provided, with a relatively simple unit (110) that includes the terminus body (30), a helical spring (34) lying around a shaft (32) of the terminus body, and with a retention sleeve device (52) that retains the spring on the shaft prior to mounting the terminus assembly and which thereafter slideably mounts the terminus in a connector housing so the terminus body can slide rearwardly. The shaft is provided with a recess (160) that forms a forwardly-facing shoulder (162). The retention sleeve device lies around the shaft and has at least one tine (152) that extends rearward and at least partially radially inward and against the shaft shoulder, with the tine being biased radially inward.

10 Claims, 5 Drawing Sheets

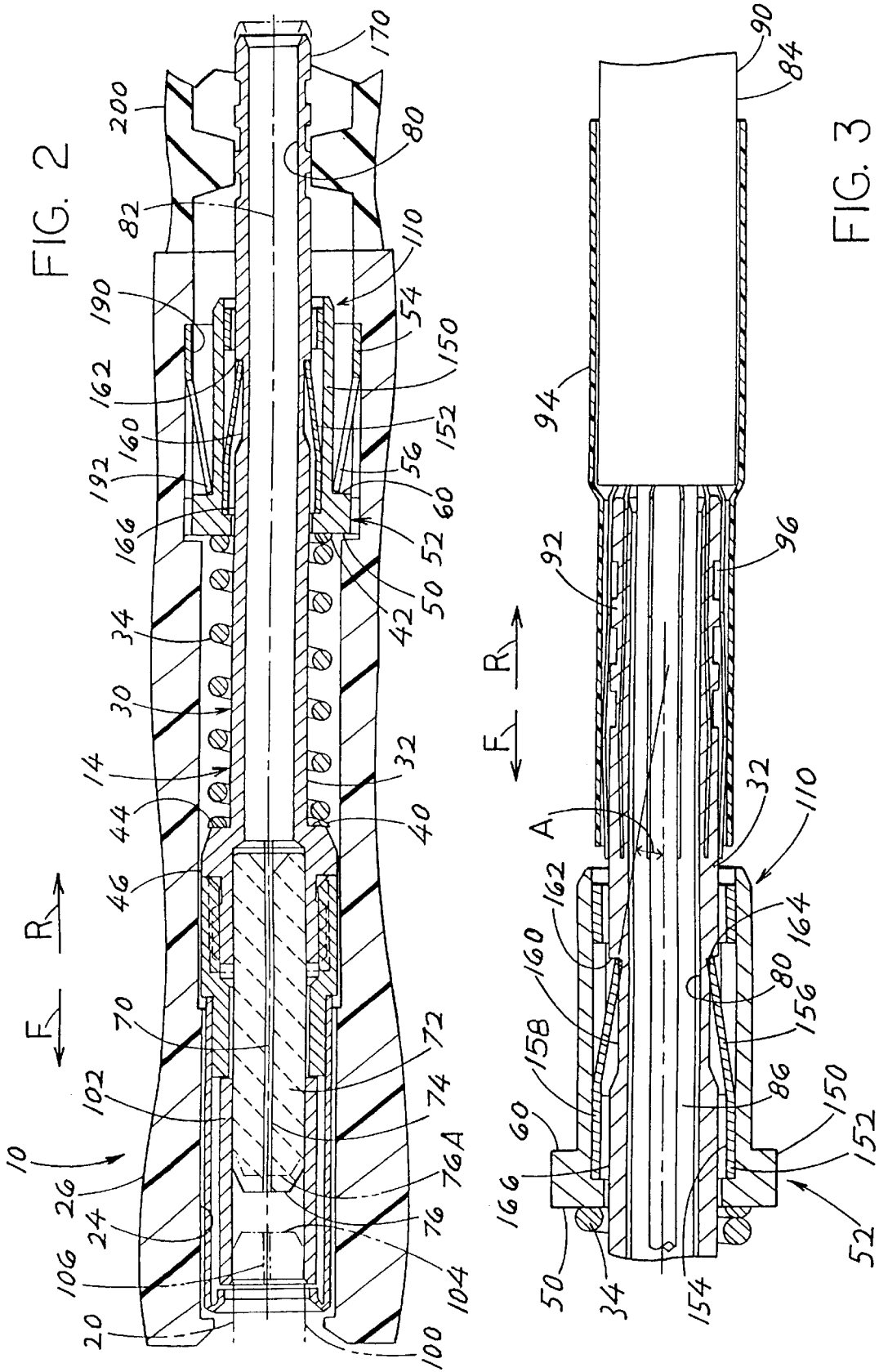

TERMINUS BODY RETENTION

BACKGROUND OF THE INVENTION

An optical fiber connector can include a housing with one or more passages and a terminus mounted in each passage. Each terminus has a bore that holds an optical fiber so a tip of the fiber lies at the front end of the terminus. When a pair of connectors mate, the ferrules of the termini abut, with at least one of the ferrules sliding backward. A spring allows the terminus to slide backward slightly while biasing the terminus forwardly.

A manufacturer of the terminus usually provides a unit that includes the terminus body, the spring, and a means that holds the spring in place until the terminus is inserted into a connector housing, and which thereafter helps retain the terminus unit in the housing. The fact that the spring must be retained on a shaft of the terminus body, has previously required the terminus body to be made into parts, with a rear part mounted on the rest of the body only after the spring has been installed. This increases the cost of the terminus body. Also, the connector housing had a retention plate to mount the terminus body in the housing. A low cost device that retained the helical spring on the terminus body shaft prior to mounting in a connector housing passage, and which thereafter held the terminus securely in the housing passage while allowing limited rearward sliding of the terminus body, would be of value.

SUMMARY OF THE INVENTION

In accordance with one embodiment of the present invention, an optical fiber terminus and an optical fiber connector that includes such terminus, as well as a method, are provided, wherein a retention device is used to hold the terminus together as a unit prior to installation in a connector housing passage, as well as to retain the terminus in the passage. The terminus includes a terminus body, a substantially helical spring, and a retention device. The terminus body includes a shaft with the spring lying on the shaft, a front abutment that can abut a front end of the spring, and a shaft recess forming a shoulder. The retention device holds the spring on the shaft prior to installation in a connector housing passage. When installed in a passage, the retention device retains the terminus body and spring from moving completely out of the housing and allows the body to slide a limited distance rearward while being biased forwardly by the spring.

The retention device includes a sleeve that lies around the shaft rearward of the spring, the device having at least one tine that extends at least partially radially inwardly and against a shaft shoulder formed at the rear of the shaft recess. The sleeve also has a rearwardly-facing shoulder that allows it to be retained by a retention clip that is installed in the housing passage.

The novel features of the invention are set forth with particularity in the appended claims. The invention will be best understood from the following description when read in conjunction with the accompanying drawings.

BRIEF DESCRIPTION OF THE DRAWINGS

FIG. 2 is a sectional view taken on line 2—2 of FIG. 1.

FIG. 3 is a partial side view of a portion of the terminus of FIG. 2, with an optical cable installed and with a heat shrink tube installed but not yet shrunk.

DESCRIPTION OF THE PREFERRED EMBODIMENTS

Figure 1:
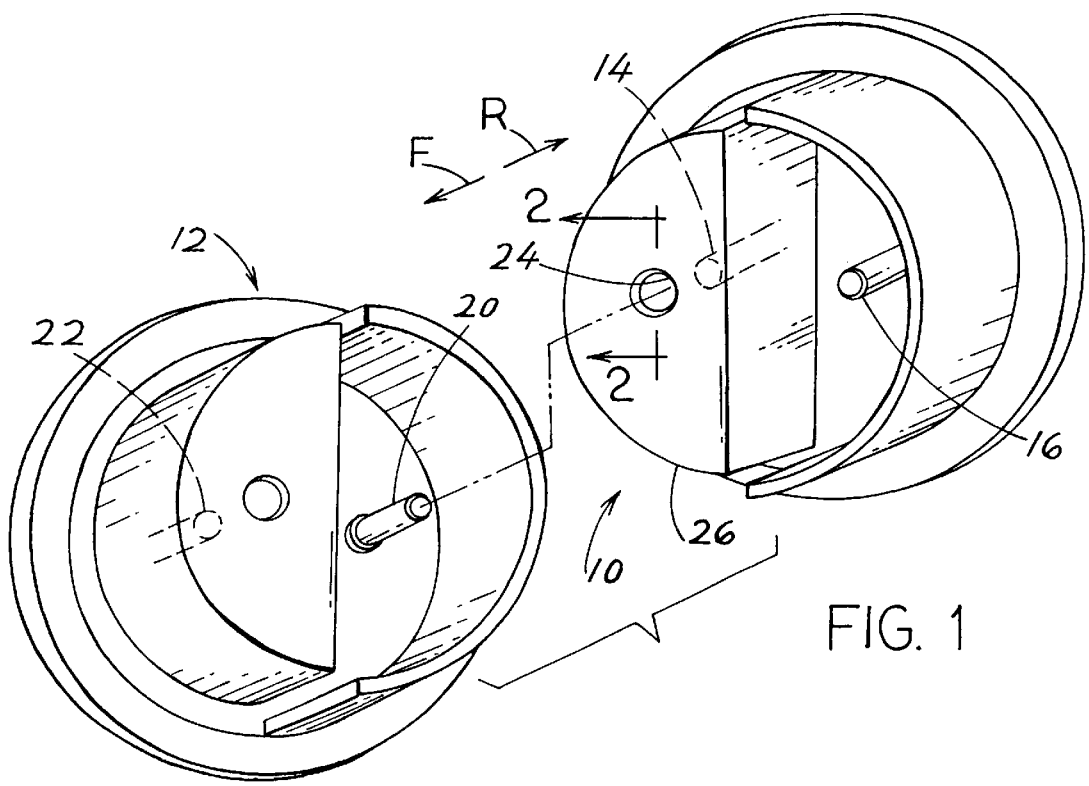
FIG. 1 is an exploded isometric view of first and second optical fiber connectors which can be mated.

FIG. 1 illustrates first and second optical fiber connectors 10, 12 of one of many different designs, where the first connector has first and second optical fiber termini 14, 16 that can mate with corresponding termini 20, 22 of the second connector, when the two connectors are moved together. Each terminus lies in a passage such as 24 in a connector housing such as 26. As shown in FIG. 2, the terminus 14 includes a terminus body 30 with a shaft 32. A substantially helical spring 34 lies around the shaft 32. The spring has front and rear ends 40, 42. The front end of the spring abuts a front abutment 44 on a front portion 46 of the terminus body. The spring rear end abuts a forwardly-facing-abutment 50 formed on a retainer device 52. The retainer device is prevented from moving rearwardly R by an outer clip device 54 that has a tine 56 that engages a largely rearwardly-facing surface 60 on the retainer device.

The terminus body 30 is designed to hold an optical fiber 70. A ferrule 72 of the terminus, which is mounted at the front of the terminus body, has a narrow bore 74 through which the optical fiber extends, with a tip of the optical fiber being flush with the tip 76 of the ferrule. The terminus body 30 has a wider bore 80 that extends along an axis 82, to hold the cladding and buffer of an optical fiber cable. FIG. 3 shows the optical fiber cable 84 with its cladding and buffer assembly 86 extending through the bore 80 in the terminus body. A quantity of epoxy (not shown) holds the cable in the bore. A cable jacket 90 is shown attached to a shaft and body rear 92 by a shrink tube 94. When the shrink tube is heated, it contracts to tightly grip the cable jacket 90 and to shrink into recesses 96 at the rear of the shaft.

When the second optical fiber connector is mated to the first (FIG. 2) one 10, a ferrule 100 of the second terminal 20 moves along an alignment sleeve 102 until the tip 104 of the second ferrule abuts the tip 76 of the first ferrule. Such abutment assures that the tips of the optical fibers 70, 106 will abut one another. The second ferrule 100 is inserted deeply enough to cause the first ferrule 72 to move rearwardly until its tip moves to a position such as 76A, to assure that the tips of the ferrules press firmly against one another. During such rearward movement of the first ferrule 72, the spring front end 40 moves rearward to further compress the helical spring. The retainer device 52 does not move rearwardly, so that it backs up the spring to prevent its rear end 42 from moving rearwardly.

The terminus 14, including the body 30, spring 34, and retainer device 52 are manufactured in large quantities by a manufacturer who sells the assembly 110 to a company that installs the optical fiber cable and then inserts the assembly 110 into the passage 24 of the first connector 10. The assembly 110 should hold together to prevent loss of the spring and other parts. The retainer device 52 provides a means for retaining the spring 34 on the terminus body prior to mounting the terminus in the connector passage. The retainer device 52 also serves as a means that retains the terminus within the passage so the terminus does not fall out in a rearward direction R and is not pulled out when the cable is pulled rearwardly, while allowing the terminus body 30 to move rearwardly by a limited distance, until the helical spring 34 is completely compressed so its turns abut one another.

Figure 4:
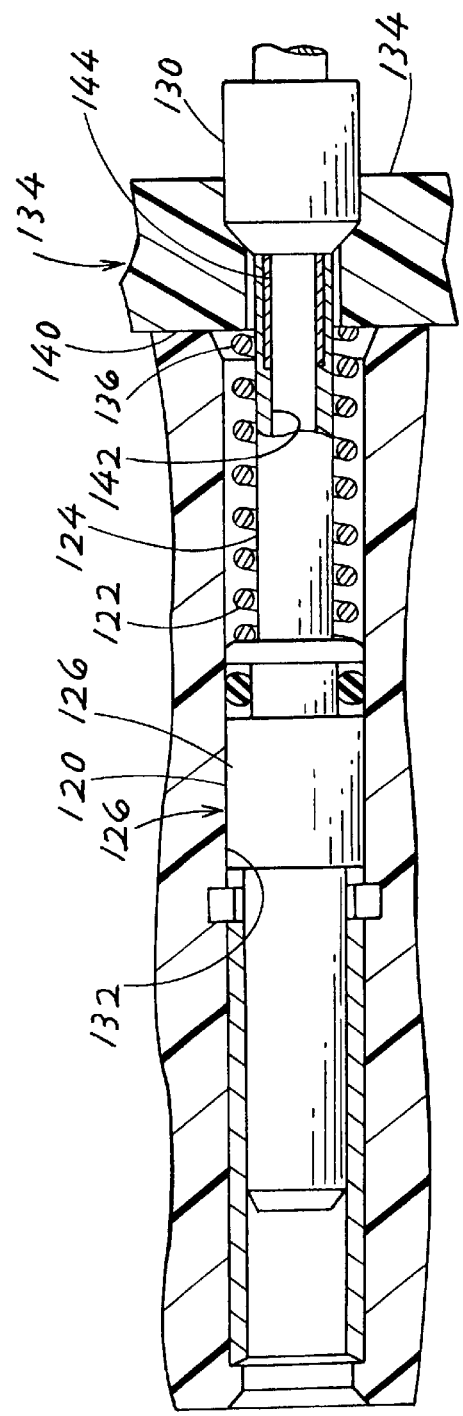
FIG. 4 is sectional view of a portion of a connector of the prior art.

FIG. 4 shows a prior art terminus 120 that applicant has previously used. The terminus included a spring 122 that lay around a shaft 124 of a terminus body 126. A flange, or enlargement, 130 was used to retain the spring on the shaft until the assembly could be mounted in the passage 132 of a housing. The assembly was mounted on a yoke 134, with the enlargement 130 lying against a rear portion of the yoke, and with the spring having a rear end 136 lying against a front surface 140 of the yoke. In order to assemble the spring onto the shaft 134, the enlargement 130 was machined as a separate part, with a short tube 144 that slid into an enlarged rear end of the bore 142 in the terminus body. The need to form the enlargement 130 as a separate part and mount it to the rest of the terminus body and fix it in place, and the need to provide a separate yoke 134 on which one or a plurality of termini were mounted, with the yoke having to be held to the rest of the connector housing, resulted in a connector of increased cost and complexity.

Applicant's retainer device 52, shown in FIGS. 2 and 3, requires a separate device to be constructed to hold the spring in place and to mount the assembly in the housing passage. However, the separate retainer device 52 can be detachably mounted to the terminus body, and it avoids the need for a separate yoke and means to mount the yoke on the rest of the connector housing.

As shown in FIG. 3, the retainer device 52 includes a retainer sleeve 150 that forms the forwardly-facing abutment 50 that abuts the rear end of the spring, and that forms the rearwardly-facing surface 60 that abuts the tine that holds the retainer device in place. The retainer device also includes an inner clip 152 with a cylindrical portion 154 and inner tines 156. The inner clip lies in a recess 158 in the sleeve. The shaft 32 is formed with a recess 160 that forms a forwardly-facing shoulder 162. The inner tine has a rear tip 164 that can abut the shaft shoulder 162. This prevents the sleeve 150 from moving rearwardly R, under the rearward force of the spring 34 thereon. However, the shaft 32 can slide rearwardly relative to the retention device 52, by the inner tine 156 merely sliding along the shaft recess 160 or on a shaft surface portion 166 lying forward of the recess. Thus, when the second ferrule 100 (FIG. 2) is pushed rearwardly, and causes the first ferrule 72 and terminus body 30 to move rearwardly, by compression of the spring 34, the retainer device 52 does not move rearwardly, but it allows the shaft 30 to slide rearwardly.

Figure 5:
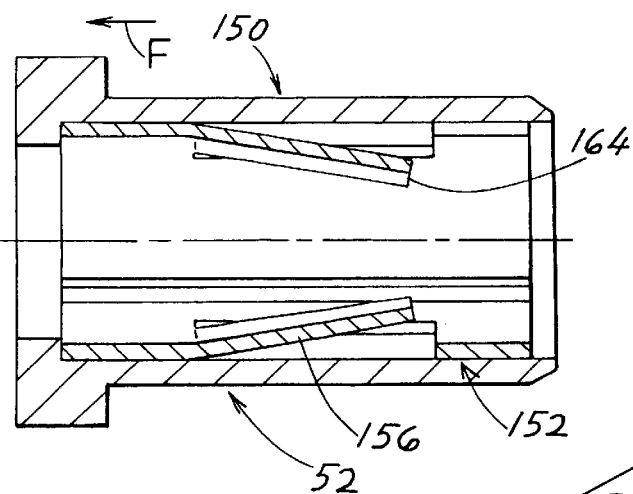
FIG. 5 is an enlarged sectional view of the retainer device of the terminus of FIG. 2.
Figure 6:
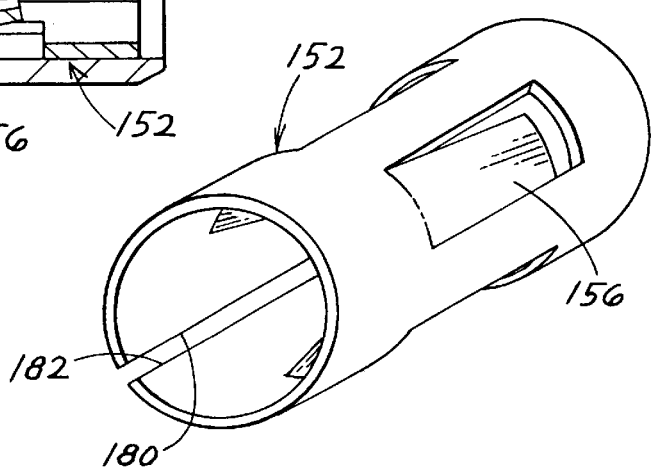
FIG. 6 is a front isometric view of the body retainer clip of the retainer device of FIG. 5.

To assemble the terminus assembly 110, the helical spring 34 is slid forwardly onto the rear end 170 of the shaft. The retainer device 52 is assembled by sliding the inner retention clip 152 into the retainer sleeve 150. FIG. 6 shows that the inner retention clip 152 is formed from a piece of sheet metal in which three tines 156 have been formed as shown, with the clip having generally parallel edges 180, 182 that are slightly separated. The clip 152 is compressed when slid into the sleeve, and friction holds it in place in the sleeve. With the clip inserted into the sleeve, as shown in FIG. 5, the retention sleeve device is slid forwardly F along the shaft 32 as shown in FIG. 2, until the rear tips 164 of the inner tines 156 pass forward of the shaft shoulder 162. The spring 34 will be slightly compressed when this happens. Thereafter, the assembly 110 that includes the terminus body, spring, and retainer device 52, will remain as a unit, without danger that the spring will come off.

The outer clip device 54 is installed in a holding recess 190 formed in the connector housing. The assembly 110 of the terminus body 30 with a spring 34 and retainer device 52, and with a ferrule 72 installed thereon, is first assembled to the optical cable. Then the terminus is slid forwardly F into the housing passage 24. When the rearwardly facing surface 60 on the retainer sleeve passes by the forward tip 192 of the outer clip device, the clip front end snaps behind the rearwardly-facing surface 60 on the sleeve. This locks the retainer device, and therefore the terminus 14 in the connector body. The terminus can be removed by inserting a special tool through a soft rubber part 200 of the housing and closely within the outer clip device 54. Then, the tool and terminus are pulled rearwardly out of the connector housing. If the terminus must be removed from the cable, it is cut off from the front end of the optical cable and discarded.

Figure 7:
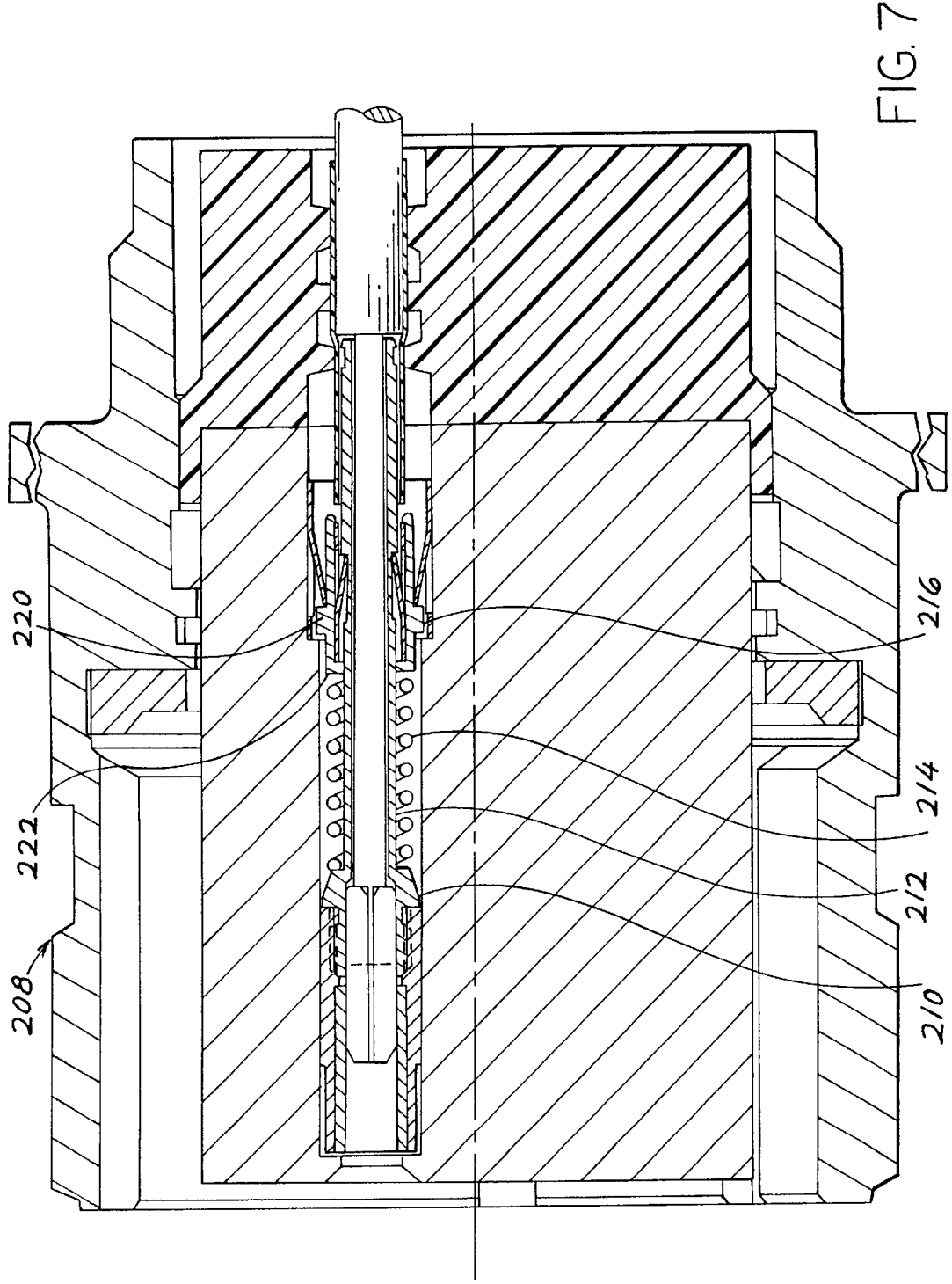
FIG. 7 is a sectional view of an optical fiber connector of a second embodiment of the invention.
Figure 8:
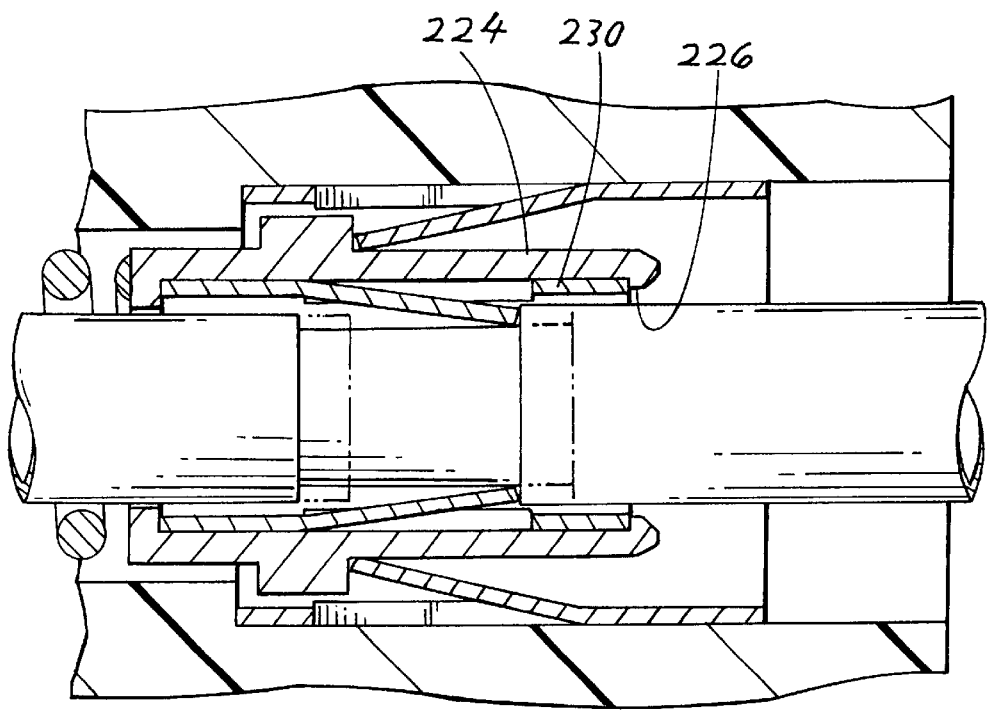
FIG. 8 is an enlarged view of a portion of the connector of FIG. 7, showing the retaining device and adjacent parts.

FIGS. 7 and 8 show another connector 208 with a terminus 210 that includes a body 212, spring 214, and retainer device 216. The retainer device is similar to that of FIGS. 1–3 and 5–6, except that it has a flange 220 that lies rearward of the rear abutment 222. Also, as shown in FIG. 8, the sleeve 224 has an inward projection 226 to retain the inner clip 230 in the sleeve. Often, it is sufficient to use friction to hold the inner clip in place.

Figure 9:
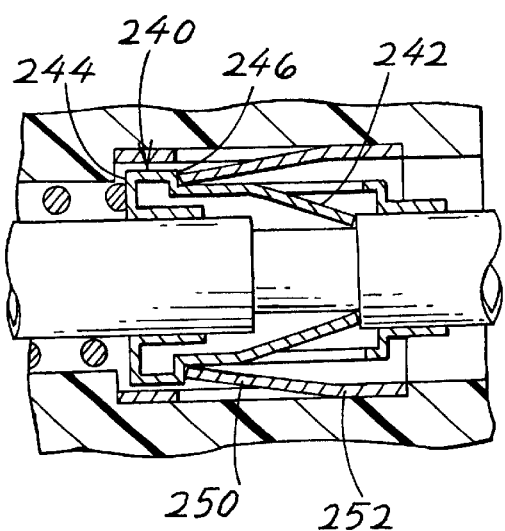
FIG. 9 is a partially sectional view of an optical fiber connector of a third embodiment of the invention.

FIG. 9 shows a retainer device 240 formed from a single piece of sheet metal that has been appropriately bent. The retainer device includes tines 242 that are integral with a rear abutment 244 that abuts the spring rear end, and a rearwardly-facing surface 246 that is engaged by an outer tine 250 of an outer clip 252.

Figure 10:
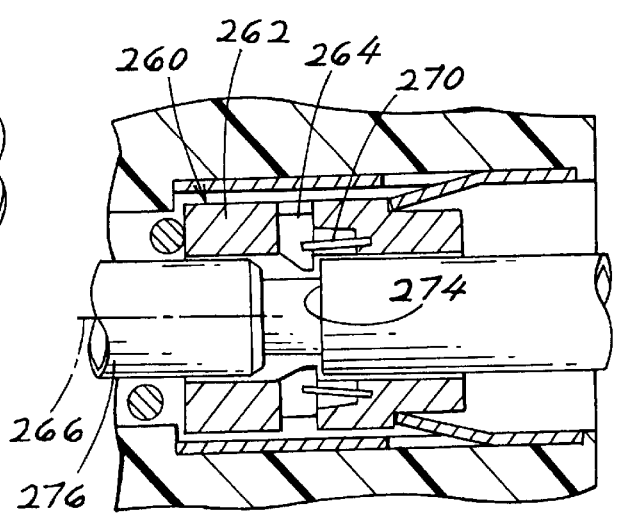
FIG. 10 is a partial sectional view of an optical fiber connector of a fourth embodiment of the invention.

FIG. 10 shows still another retainer device 260 that includes a sleeve 262 and tines in the form of projections 264 that can move primarily radially to the axis 266 of the terminus. A leaf spring 270 urges each projection 264 radially inwardly, where it abuts a shoulder 274 formed in a recess of the shaft 276. However, if the shaft moves rearwardly, it deflects the projection 264 radially outward.

Thus, the invention provides an optical fiber terminus, an optical fiber connector with such terminus, and a method for holding a helical spring on a shaft of a terminus body. Instead of providing an enlargement that lies against a yoke that backs up the spring, applicant provides a retainer device that slips over the shaft of the terminus body and that locks to a shoulder formed in a recess in the shaft. The retainer device has a tine that limits forward movement of the shaft to prevent the retainer device from falling off the shaft prior to mounting, and yet the tine allows the shaft to move rearwardly as the spring is compressed during insertion of a mating second ferrule against a first ferrule of the terminus. The retainer device can include a retainer sleeve and a separate or integral clip with tines.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber terminus, comprising:

a terminus body having an axis and having a through bore for holding an optical fiber, said body having a front abutment and a shaft extending rearwardly from said front abutment, with said front abutment having a larger diameter than said shaft, with said shaft having a recess forming a largely forwardly-facing shaft shoulder at a location that is spaced rearwardly from said front abutment;

a largely helical spring that lies around said shaft and that has a spring front end that is positioned to engage said front abutment, with said spring having a spring rear end;

a retention sleeve device that lies around said shaft at a location rearward of said spring to prevent said spring from sliding rearwardly off said shaft, said retention sleeve device having at least one tine that extends at least partially radially inward and against said shaft shoulder.

2. The terminus described in claim 1 wherein:

said retention sleeve device includes a retention sleeve that surrounds said shaft and that forms a largely forwardly-facing abutment for abutting said spring rear end, and an inner clip that is coupled to said sleeve to resist relative axial movement and that forms said tine, with said tine extending at a rearward and radially inward incline to said axis.

3. The terminus described in claim 1 wherein:

said retention sleeve device forms a largely rearwardly-facing outer sleeve abutment that is accessible from an outside of said sleeve device; and including a housing with at least one through passage extending along said body axis, with said terminus body, spring, and sleeve device lying in said passage;

an outer clip that lies in said passage and that has at least one outer clip tine that extends at a forward and radially inward incline, with said outer clip tine having a front end that abuts said sleeve abutment, to thereby prevent sleeve device rearward movement after installation while allowing sleeve device forward movement during sleeve device installation.

4. The terminus described in claim 1 wherein:

said terminus body has an extreme rear end, said shaft extends to said extreme rear end, said spring is formed by a wire extending in a helix and said spring has a predetermined spring inside diameter and all of said shaft has an outside diameter substantially no greater than said spring inside diameter, to allow said spring to easily slide onto said shaft.

5. An optical fiber connector that includes a housing having at least one through passage with a passage axis extending in forward and rearward directions, said connector also including an optical fiber terminus lying in said passage, where said terminus includes a terminus body with a front portion forming a largely rearwardly facing front abutment, a shaft of smaller diameter than said abutment extending rearwardly from said front abutment, and a substantially helical spring lying around said shaft, wherein:

said shaft forms a largely forwardly-facing shaft shoulder at a location rearward of said front abutment; and including a retainer device that lies in said passage and that is substantially fixed against axial movement therein, said device lying around said shaft and having a largely forwardly-facing abutment for abutting said spring rear end, said retainer device having at least one resilient tine that is positioned to engage said shaft shoulder to prevent said retainer device from moving rearwardly off said shaft, while allowing said shaft to move rearwardly with respect to said retainer device.

6. The connector described in claim 5 wherein:

said retainer device includes a sleeve with a recess, and an inner clip that lies in said recess and forms said at least one tine, said sleeve having an outside forming a largely rearwardly facing surface;

an outer clip device that lies in said passage of said housing and that has at least one tine extending at a forward and radially inward incline and having a tine front end that abuts said largely rearwardly-facing surface of said sleeve.

7. A method for holding a substantially helical spring on a shaft of a terminus body that is part of a terminus that has an axis, so the spring does not slide rearwardly off the shaft prior to mounting the terminus in a housing passage of an optical fiber connector, and so the terminus body can slide rearwardly while compressing the spring, comprising:

forming said shaft with a largely rearwardly-facing shaft shoulder;

sliding said spring onto the rear of said shaft and forwardly along said shaft;

sliding a sleeve device that includes a rearward and radially-inwardly inclined tine, until the tine snaps behind the shaft shoulder;

installing said terminus in said housing passage, including fixing said sleeve device in axial position along said housing passage.

8. The method described in claim 7 wherein:

said step of sliding a sleeve device includes sliding a body-retaining inner clip that forms said tine, into a sleeve passage of a sleeve of said sleeve device, until a front end of the clip abuts a rearwardly-facing internal surface of the sleeve, where the sleeve has an external rearwardly-facing sleeve outer surface;

said step of installing said terminus includes sliding an outer clip forwardly into said housing passage, where said outer clip has at least one forward and radially-inwardly extending tine, and then pushing said terminus forwardly into said housing passage until said tine of said outer clip snaps behind said sleeve outer surface.

9. An optical fiber terminus, comprising:

a terminus body having an axis and having a through bore for holding an optical fiber, said body having a front abutment and a shaft extending rearwardly from said front abutment, with said front abutment having a larger diameter than said shaft, with said shaft forming a largely forwardly-facing shaft shoulder at a location that is spaced rearwardly from said front abutment;

a largely helical spring that lies around said shaft and that has a spring front end that is positioned to engage said front abutment, with said spring having a spring rear end;

means that lies around said shaft at a location rearward of said spring and that abuts said shaft shoulder, for preventing said spring from sliding rearwardly off said shaft, while allowing said shaft to slide rearwardly by a limited distance relative to said means.

10. The terminus described in claim 9 wherein:

said means forms a largely rearwardly-facing outer abutment that is accessible from an outside of said means; and including a housing with at least one through passage extending along said body axis, with said terminus body, spring, and said means lying in said passage;

an outer clip that lies in said passage and that has at least one outer clip tine that extends at a forward and radially inward incline, with said outer clip tine having a front end that abuts said outer abutment.

\* \* \* \* \*